(12) United States Patent
Wilson

(10) Patent No.: US 11,060,661 B2
(45) Date of Patent: Jul. 13, 2021

(54) MOUNTING DEVICE FOR USE OUTDOORS

(71) Applicant: Carlos Lee Wilson, Brighton, IA (US)

(72) Inventor: Carlos Lee Wilson, Brighton, IA (US)

( * ) Notice: Subject to any disclaimer, the term of this patent is extended or adjusted under 35 U.S.C. 154(b) by 88 days.

(21) Appl. No.: 16/579,147

(22) Filed: Sep. 23, 2019

(65) Prior Publication Data
US 2020/0109815 A1 Apr. 9, 2020

Related U.S. Application Data

(60) Provisional application No. 62/741,651, filed on Oct. 5, 2018, provisional application No. 62/826,181, filed on Mar. 29, 2019.

(51) Int. Cl.
*F16M 13/02* (2006.01)
*F16B 37/16* (2006.01)

(52) U.S. Cl.
CPC ........... *F16M 13/022* (2013.01); *F16B 37/16* (2013.01)

(58) Field of Classification Search
CPC ........... F16M 13/022; F16M 2200/022; A01M 31/002
See application file for complete search history.

(56) References Cited

U.S. PATENT DOCUMENTS

| | | | | |
|---|---|---|---|---|
| 1,582,381 A | * | 4/1926 | Citero | F16M 13/00 248/217.4 |
| D140,011 S | * | 1/1945 | Creedon | D16/242 |
| 2,375,214 A | * | 5/1945 | Creedon | F16M 11/14 248/126 |
| D144,840 S | * | 5/1946 | Creedon | D16/242 |
| 5,626,322 A | * | 5/1997 | Braun | F16M 11/10 248/274.1 |
| 5,669,592 A | * | 9/1997 | Kearful | F16M 11/14 248/217.4 |
| 7,975,973 B1 | * | 7/2011 | Weeden | F16M 13/02 248/217.4 |
| 8,087,626 B1 | * | 1/2012 | Weeden | F16M 11/14 248/218.4 |
| 8,397,738 B2 | * | 3/2013 | Livacich | E04H 15/001 135/90 |
| 8,485,676 B2 | * | 7/2013 | McCarty, Jr. | G02B 5/08 359/855 |
| D729,302 S | * | 5/2015 | Reese | D16/242 |
| D729,863 S | * | 5/2015 | Gorsuch | D16/242 |
| 9,188,280 B2 | * | 11/2015 | Congdon | F16M 11/14 |

(Continued)

*Primary Examiner* — Bradley Duckworth
(74) *Attorney, Agent, or Firm* — McKee, Voorhees & Sease, PLC

(57) ABSTRACT

A mounting device includes a first male threaded fastening member such as a lag screw and a second male threaded fastening member such as a bolt. The male threaded fastening members are secured to one another through a joining member such as a bolt and female threaded fastening members such as wingnuts or star knobs. Tightening the female threaded fastening members fixes an angle between the male threaded fastening members without the use of tools. The first male threaded fastening member typically mounts to a tree, a post, or the ground and the second male threaded fastening member typically mounts to a camera or other electronic device. Adapters can secure the mounting device to steel fence posts or step-in posts. An internal spacing device with a flange prevents wear and tear of components of the mounting device.

13 Claims, 14 Drawing Sheets

(56) References Cited

U.S. PATENT DOCUMENTS

| | | | | |
|---|---|---|---|---|
| D753,210 S | * | 4/2016 | Gorsuch | D16/242 |
| 10,495,953 B2 | * | 12/2019 | Calhoun | G03B 17/561 |
| 10,534,243 B2 | * | 1/2020 | Jeske | F16M 11/041 |
| 10,788,160 B2 | * | 9/2020 | Elias | F16M 11/2021 |
| 10,866,493 B2 | * | 12/2020 | DeMers | F16M 11/14 |
| 2011/0220768 A1 | * | 9/2011 | Hayes | F16M 13/02 |
| | | | | 248/219.4 |
| 2018/0128422 A1 | * | 5/2018 | Jasko | G03B 17/561 |
| 2018/0202601 A1 | * | 7/2018 | Kelly | F16M 13/02 |

* cited by examiner

MOUNTING DEVICE FOR USE OUTDOORS

CROSS REFERENCE TO RELATED APPLICATIONS

This application claims priority under 35 U.S.C. § 119 to provisional patent applications U.S. Ser. No. 62/741,651, filed Oct. 5, 2018, and U.S. Ser. No. 62/826,181, filed Mar. 29, 2019. The provisional patent applications are herein incorporated by reference in their entirety, including without limitation, the specification, claims, and abstract, as well as any figures, tables, appendices, or drawings thereof.

FIELD OF THE INVENTION

The present invention relates generally to a mounting device for use in at least the hunting, hiking, wildlife research, security, and surveillance industries. More particularly, but not exclusively, the present invention relates to a mounting device and related accessories which reduce the costs associated with and simplify the process of mounting cameras and other objects while hunting, hiking, exploring, studying wildlife, or the like.

BACKGROUND OF THE INVENTION

The background description provided herein gives context for the present disclosure. Work of the presently named inventors, as well as aspects of the description that may not otherwise qualify as prior art at the time of filing, are neither expressly nor impliedly admitted as prior art.

Cameras are often used by hunters, bird watchers, researchers, and others in various outdoor environments to record wildlife activities of various animals and to record natural activities or events in nature. The cameras are often left unattended and must be securely mounted so that they will not be knocked down or disturbed. Known mounting devices are complex, bulky, expensive, time-consuming to install, not easily customized, and cannot function in a wide variety of environments.

Therefore, there exists a need in the art for a device that simplifies the number of parts used to mount cameras or other related apparatuses, reduces the costs associated with manufacturing such a device, and is easily installed and uninstalled in trees, posts, the ground, and other potential locations for mounting the device.

SUMMARY OF THE INVENTION

Therefore, it is a primary object, feature, and/or advantage of the present invention to improve on or overcome the deficiencies in the art.

It is still yet a further object, feature, and/or advantage of the present invention to provide an outdoor camera mounting device that is easily adjusted or varied without requiring the use of tools.

It is still yet a further object, feature, or advantage of the present invention to provide a device that complies with any laws and regulations which apply to the intended use of the device (e.g., hunting, bird watching, wildlife viewing, etc.).

It is still yet a further object, feature, and/or advantage of the present invention to provide an outdoor mounting device that may be used with a wide variety of objects and in a wide variety of applications. For example, cameras (including security cameras), other electronic devices (e.g., tablets and phones), sensors, feed banks or bait stations, and weapon holders may all be mounted to the device. The device may be mounted to trees, step in posts, steel fence posts (also referred to as U-channel posts, T-posts, Y-posts, etc.), other similar devices, or the like.

It is still yet a further object, feature, and/or advantage of the present invention to provide a cost-effective, weatherproof, and durable outdoor camera mounting device.

It is still yet a further object, feature, and/or advantage of the present invention to provide an outdoor camera mounting device having a distinct aesthetic appearance.

It is still yet a further object, feature, and/or advantage of the present invention to practice methods which facilitate use, manufacture, assembly, maintenance, and repair of an outdoor mounting device accomplishing some or all of the previously stated objectives.

It is still yet a further object, feature, and/or advantage of the present invention to incorporate the outdoor mounting device into a system accomplishing some or all of the previously stated objectives.

It is still yet a further object, feature, and/or advantage of the present invention to provide the outdoor mounting device with related accessories in a kit accomplishing some or all of the previously stated objectives. For example, devices for calling birds or game, bait, sensors, and the like can be included with and/or mountable to the outdoor mounting device and/or other electronic device.

The previous objects, features, and/or advantages of the present invention, as well as the following aspects and/or embodiments, are not exhaustive and do not limit the overall disclosure. No single embodiment need provide each and every object, feature, or advantage. Any of the objects, features, advantages, aspects, and/or embodiments disclosed herein can be integrated with one another, either in full or in part.

According to some aspects of the present disclosure, a mounting device comprises a first male threaded fastening member, and a second male threaded fastening member secured to the first male threaded fastening member with a male threaded joining member and a female threaded fastening member. The first male threaded member is adapted to mount to an outdoor structure and the second male threaded member is adapted to secure an object thereto. Tightening the female threaded fastening member is possible without the use of tools and tightening the female threaded fastening member fixes an angle between the male threaded fastening members.

According to some other aspects of the present disclosure, an extension unit comprises at least two mounting devices according any of the aspects described above. The at least two mounting devices are coupled to one another through coupling nut(s). The extension unit allows for an object secured to one of the mounting devices to be set at a desired position and orientation.

According to some additional aspects of the present disclosure, the mounting device further comprises a spacing device encompassing the threaded portion of the male threaded joining member and being located at least partially between the first male threaded fastening member and the second male threaded fastening member.

According to some other aspects of the present disclosure, a method of mounting the mounting device comprises securing the first male threaded fastening member to an outdoor structure, securing the second male threaded fastening member to an object, and using an additional female threaded fastening member to prevent movement of the object after securing the second male threaded fastening member.

According to some other aspects of the present disclosure, an adapter for a mounting device comprises a rigid, annular body and a female threaded receiver. The annular body comprises a circumferential surface defined by an outer diameter, a thickness beginning at the outer diameter and terminating at an inner diameter, and a height which can be equal to or less than twice the inner diameter. The female threaded receiver can comprise a protrusion from the circumferential surface or can be located within a cavity of the rigid, annular body traversing the thickness of the circumferential surface. The female threaded receiver can be centrally located within the circumferential surface with respect to the height. Additional female threaded receivers can be located adjacent the female threaded receiver, on the circumferential surface 90 degrees from the female threaded receiver, 180 degrees from the female threaded receiver, or above or below the female threaded receiver on the circumferential surface. The outer diameter can be sized to encompass a portion of a step-in post, T-post, or Y-post.

These and/or other objects, features, advantages, aspects, and/or embodiments will become apparent to those skilled in the art after reviewing the following brief and detailed descriptions of the drawings.

Figure 1:
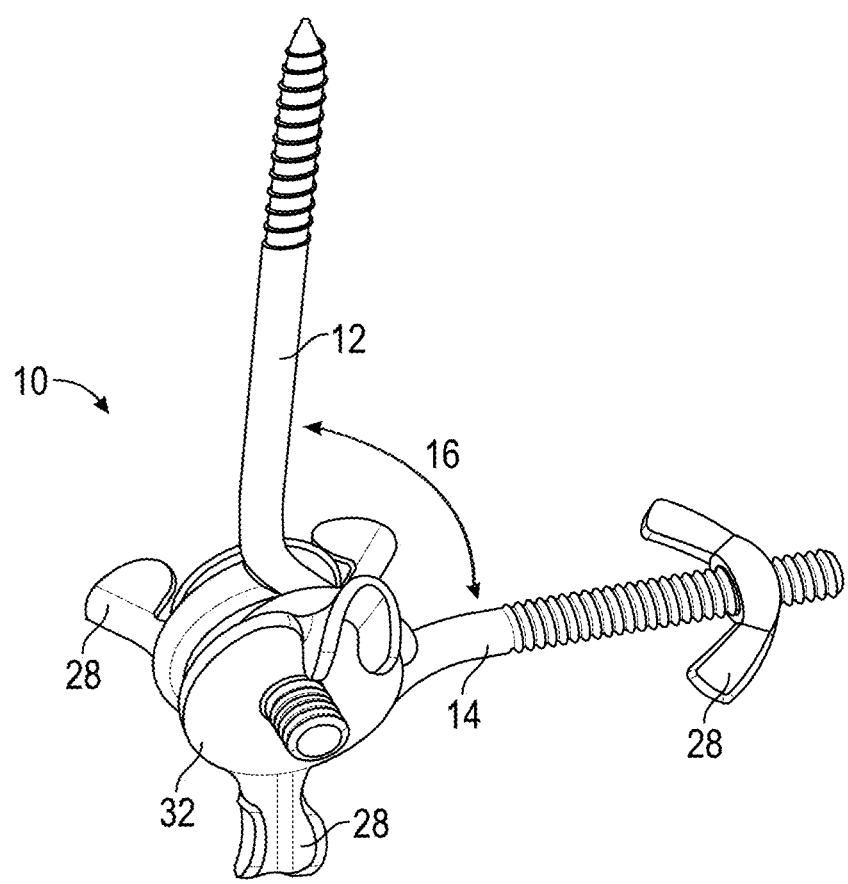
FIG. 1 shows a perspective view of a mounting device including a wingnut, according to some aspects of the present disclosure.

Several embodiments in which the present invention may be practiced are illustrated and described in detail, wherein like reference characters represent like components throughout the several views. The drawings are presented for exemplary purposes and may not be to scale, unless otherwise indicated, and thus proportions of features in the drawings shall not be construed as evidence of actual proportions.

DETAILED DESCRIPTION OF THE INVENTION

Definitions—Introductory Matters

The following definitions and introductory matters are provided to facilitate an understanding of the present invention. Unless defined otherwise, all technical and scientific terms used herein have the same meaning as commonly understood by one of ordinary skill in the art to which embodiments of the present invention pertain.

The terms "a," "an," and "the" include both singular and plural referents.

The term "or" is synonymous with "and/or" and means any one member or combination of members of a particular list.

The terms "invention" or "present invention" as used herein are not intended to refer to any single embodiment of the particular invention but encompass all possible embodiments as described in the specification and the claims.

The term "about" as used herein refers to slight variations in numerical quantities with respect to any quantifiable variable. One of ordinary skill in the art will recognize inadvertent error can occur, for example, through use of typical measuring techniques or equipment or from differences in the manufacture, source, or purity of components. The claims include equivalents to the quantities whether or not modified by the term "about."

The term "configured" describes an apparatus, system, or other structure that is constructed to perform or capable of performing a particular task or to adopt a particular configuration. The term "configured" can be used interchangeably with other similar phrases such as constructed, arranged, adapted, manufactured, and the like.

Terms characterizing a sequential order (e.g., first, second, etc.), a position (e.g., top, bottom, lateral, medial, forward, aft, etc.), and/or an orientation (e.g., width, length, depth, thickness, vertical, horizontal, etc.) are referenced according to the views presented. Unless context indicates otherwise, these terms are not limiting. The physical configuration of an object or combination of objects may change without departing from the scope of the present invention.

The term "outdoor structure" as used herein may refer to trees, posts, the ground, ice, rock, buildings, or any other structures which may be used in combination with the mounting device described herein.

Terms characterizing or elements which comprise a means for fastening are not meant to be limiting, unless expressly claimed. For example, each of the threaded members (e.g., male or female) described herein may be switched if the circumstances allow for it. Additionally, alterative means for facilitating fastening, e.g., screws, nuts, bolts, nails, rivets, pins, staples, washers, clamps, clasps, flanges, ties, adhesives, any other known fastening mechanisms, or any combination thereof, may be substituted for or used in addition to the threaded members and vice versa.

As would be apparent to one of ordinary skill in the art, mechanical, procedural, or other changes may be made without departing from the spirit and scope of the invention. The scope of the invention is defined only by the appended claims, along with the full scope of equivalents to which such claims are entitled.

Overview

Referring now to FIG. 1, a mounting device 10 comprises a first male threaded fastening member 12 and a second male threaded fastening member 14. The first male threaded fastening member 12 and the second male threaded fastening member 14 are secured to one another with a with a male threaded joining member 34 and one or more female threaded fastening members 28/36.

Figure 2A:
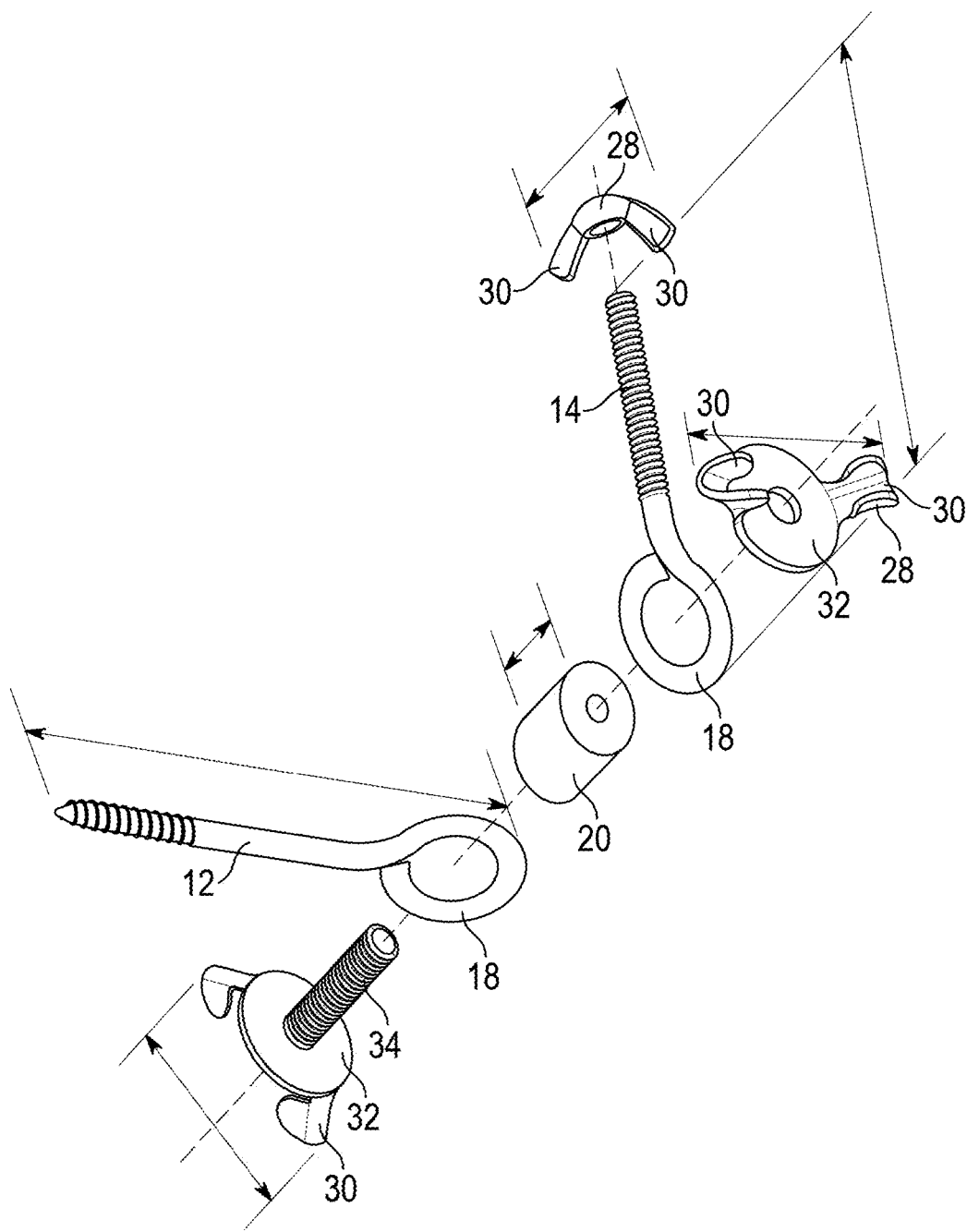
FIG. 2A shows an exploded view of the mounting device of FIG. 1, according to some aspects of the present disclosure.
Figure 2B:
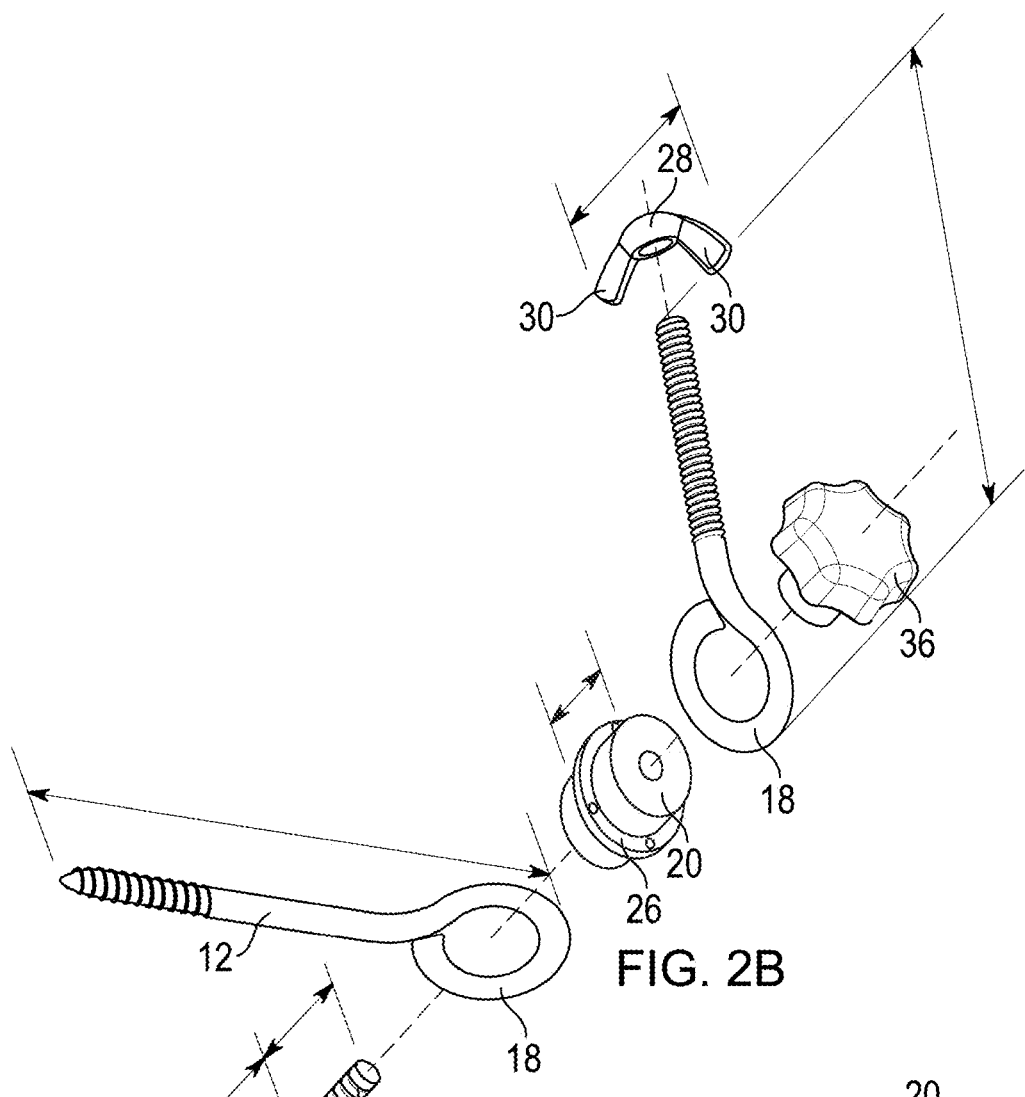
FIG. 2B shows an exploded view of an alternative mounting device including star knobs, according to some aspects of the present disclosure.

The male threaded joining member 34 is preferably a bolt and may be integrally formed with the "handle" of a traditional female threaded fastening member, such as a wingnut or star knob. Rotation of either the male threaded fastening member 34, the female threaded fastening member 28/36, or both the male threaded fastening member 34 and the female threaded fastening member 28/36 is possible without the use of tools if devices such as wingnuts 28 having wings 30 and a base plate 32 (FIG. 2A) or star knobs 36 (FIG. 2B) are used. These devices provide humans the necessary leverage to turn either the male threaded fastening member 34 or the female threaded fastening member 28/36. Tightening of the male threaded fastening member 34 with the female threaded fastening member 28/36 fixes the members 12, 14 at a selected angle 16 between the male threaded fastening members 12, 14.

The first male threaded fastening member 12 typically comprises a lag screw, a bolt, an auger, or the like. For example, if the mounting device 10 is adapted to mount to a tree 40 (shown in FIGS. 4 and 6), a lag screw may be preferred. If the mounting device 10 is adapted to mount to a post 42 (shown as a U-channel post in FIG. 5), a bolt may be preferred.

Figure 4:
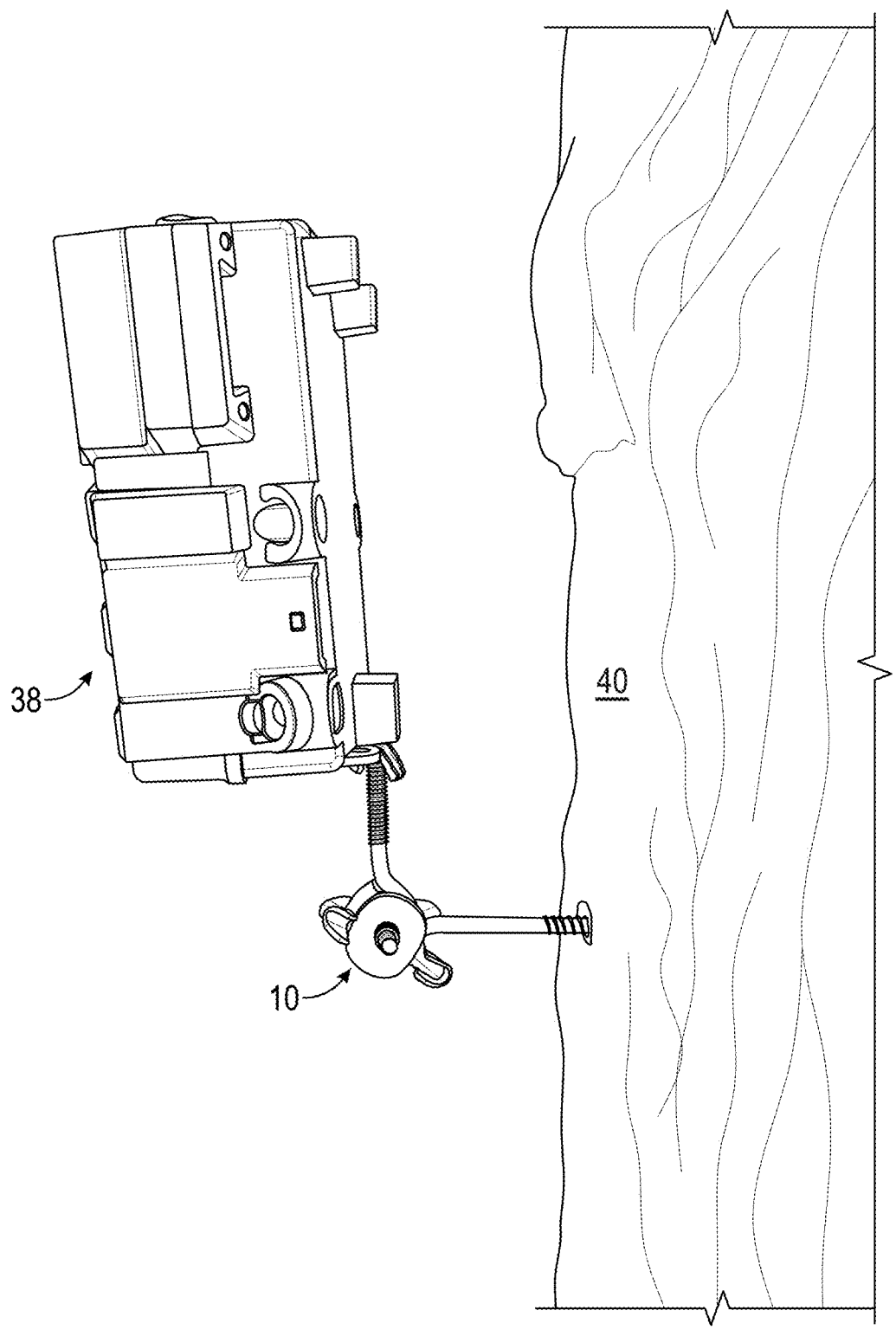
FIG. 4 shows a camera mounted to the mounting device of FIG. 1 at a lower location of the camera and the mounting device of FIG. 1 mounted to a tree, according to some aspects of the present disclosure.
Figure 5:
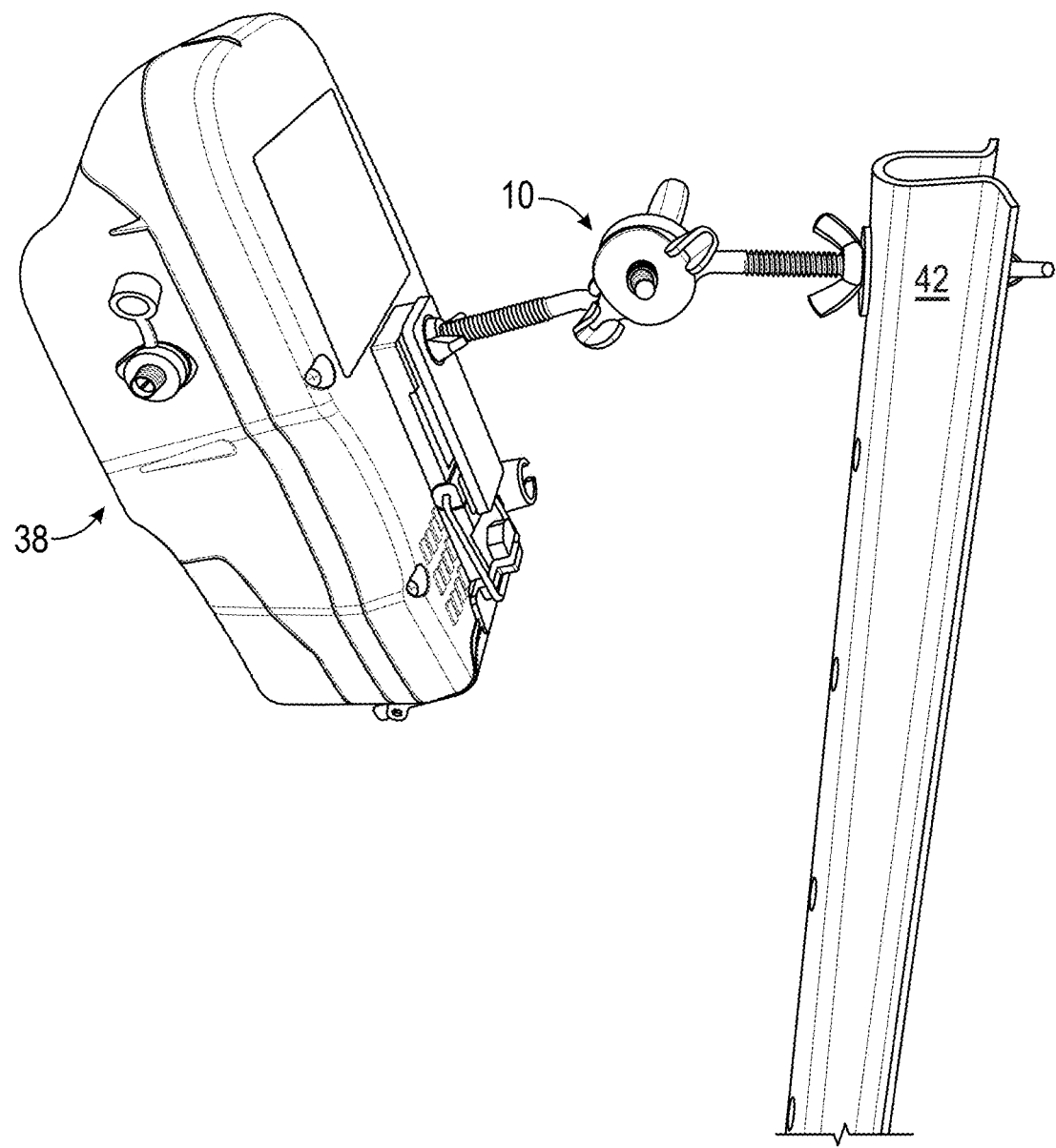
FIG. 5 shows a camera mounted of the mounting device of FIG. 1 at a rear location of the camera and the mounting device of FIG. 1 mounted to a U-channel post, according to some aspects of the present disclosure.
Figure 6:
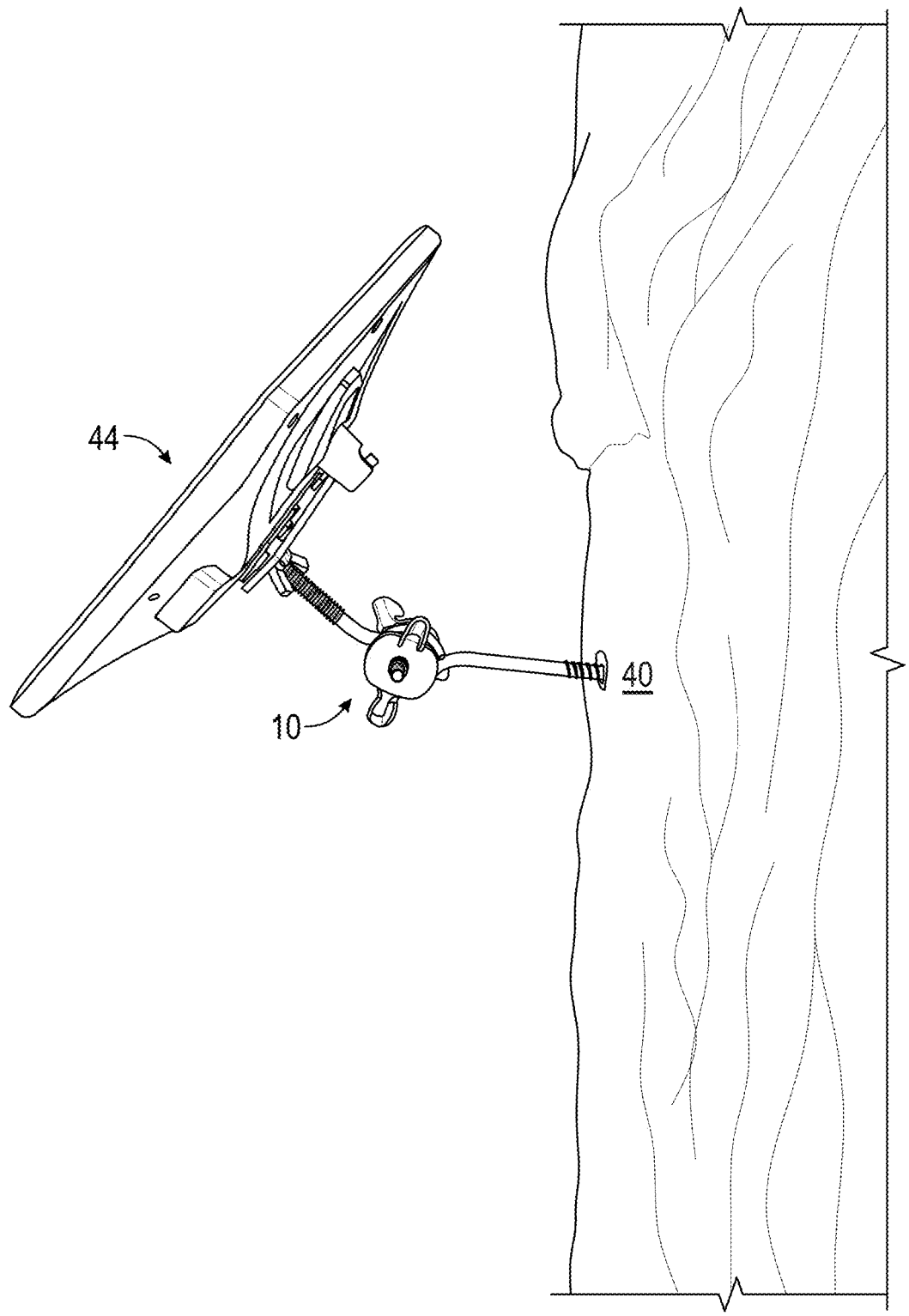
FIG. 6 shows a tablet mounted of the mounting device of FIG. 1 at a rear location of the tablet and the mounting device of FIG. 1 mounted to a tree, according to some aspects of the present disclosure.

The second male threaded fastening member 14 is preferably a bolt and allows cameras 38, shown in FIGS. 4 and 5; other electronic or recording devices (e.g., tablets 44, shown in FIG. 6, and cell phones); sensors, e.g., vision sensors, radar sensors, LIDAR sensors, heat sensors, moisture content sensors, radio frequency sensors, short-range radio, long-range radio, antennas, accelerometers, position sensors (including GPS), pressure sensors (including weight sensors), and the like; feed banks or bait stations; and weapon holders to mount to the mounting device 10.

The electronic devices described above are powered with a power supply. The power supply outputs a particular voltage to the electronic device. The power supply could be a direct current ("DC") power supply (e.g., a battery), an alternating current ("AC") power supply, a linear regulator, or the like. The power supply can be configured with a microcontroller to receive power from other grid-independent power sources, such as a generator or solar panel.

With respect to batteries, a dry cell battery may be used. Additionally, the battery may be rechargeable, such as a lead-acid battery, a low self-discharge nickel metal hydride battery ("LSD-NiMH") battery, a nickel-cadmium battery ("NiCd"), a lithium-ion battery, or a lithium-ion polymer ("LiPo") battery. Careful attention should be taken if using a lithium-ion battery or a LiPo battery to avoid the risk of unexpected ignition from the heat generated by the battery. While such incidents are rare, they can be minimized via appropriate design, installation, procedures and layers of safeguards such that the risk is acceptable.

Furthermore, the camera 38, tablet 44, or other electronic device can include a user interface. The user interface is how the user interacts with a machine. The user interface can be a digital interface, a command-line interface, a graphical user interface ("GUI") or any other way a user can interact with a machine. For example, the user interface ("UI") can include a combination of digital and analog input and/or output devices or any other type of UI input/output device required to achieve a desired level of control and monitoring for a device. Non-limiting examples of input and/or output devices include touchscreen displays, knobs, dials, switches, buttons, and the like. The user interface also can be configured with a microcontroller to display conditions or data gathered from sensors associated with the main device in real-time or substantially real-time. Input(s) received from the UI can then be sent to a microcontroller to control operational aspects of a device.

The mounting device 10 may include an additional female threaded fastening member 28, such as a wingnut, to prevent movement of the mounting device 10 with respect to the outdoor structure after securing the first male threaded fastening member 12 to the outdoor structure or to prevent movement of the object after securing the second male threaded fastening member to the object.

Each component of the mounting device 10 is preferably weatherproof, durable, and cheap to manufacture. For example, the mounting device 10 may be manufactured with stainless steel, plastic, or any other materials known to be weatherproof, durable, or cheap to manufacture. The aesthetics of the mounting device 10 may be altered for primarily ornamental purposes (e.g., to complement or match the color of the camera, other electronic device, sensor, feed bank or bait station, or weapon holder mounted to the mounting device 10) or for functional purposes (e.g., for purposes of stealth: making the mounting device 10 black for decreased visibility of the mounting device 10 at night or making the mounting device 10 camouflage colored to decrease visibility of the mounting device 10 during the day).

To increase stability of the mounting device 10, the first male threaded fastening member 12 may comprise a first hook 18 surrounding a threaded portion of the male threaded joining member 34. Similarly, the second male threaded fastening member may comprise a second hook 18 surrounding the threaded portion of the male threaded joining member 34. In at least one embodiment, the hooks 18 are only large enough to encompass the threaded portion of the male threaded joining member 34.

Preferably however, the hooks are large enough to encompass a spacing device 20 that encompasses the threaded portion of the male threaded joining member 34. The spacing device 20 is typically a nylon or rubber spacer but can comprise a spacer comprising other known materials or an alternative spacing device, such as a washer. The spacing device 20 typically comprises a substantially dark color (e.g., black, navy blue, forest green, etc.). In an embodiment where the spacing device 20 is a nylon or rubber spacer, the nylon or rubber spacer may have a length that may be equal to or less than the distance from an outer edge of the first hook 18 to an outer edge of the second hook 18. In other words, the nylon or rubber spacer will be located at least partially between the first male threaded fastening member 12 and the second male threaded fastening member 14. The nylon or rubber spacer includes an aperture passing therethrough. The aperture is defined by a first diameter 22 which is slightly larger than the diameter of the threaded portion of the male threaded joining member 34. This allows the nylon or rubber spacer to house the threaded portion of the male threaded joining member 34 during use. A second diameter 24 defines an overall circumference of the spacing device 20 which may slightly less than the circumference of the base plate 32 so that the edge of the base plate 32 may align with an outer annular surface of the hooks 18.

Figure 3A:
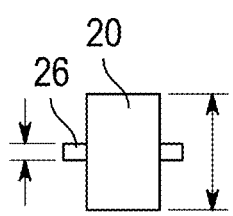
FIG. 3A shows a side view of an alternative spacing device having a flange which may be substituted for the spacing device of FIGS. 2A and 2B.
Figure 3B:
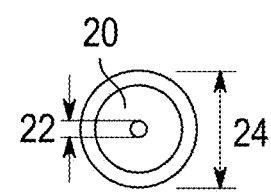
FIG. 3B shows an end view of an alternative spacing device having a flange which may be substituted for the spacing device of FIGS. 2A and 2B.

In a further embodiment, the nylon or rubber spacer includes a flange 26 (shown in FIGS. 2B, 3A, and 3B) extending from an outer surface of the spacing device 20, thereby having a diameter slightly larger than the second diameter 24. The flange 26 typically comprises nylon or rubber and will have a thickness sufficient to prevent the first hook 18 of the first male threaded fastening member 12 from contacting the second hook 18 of the second male threaded fastening member 14.

Figure 7:
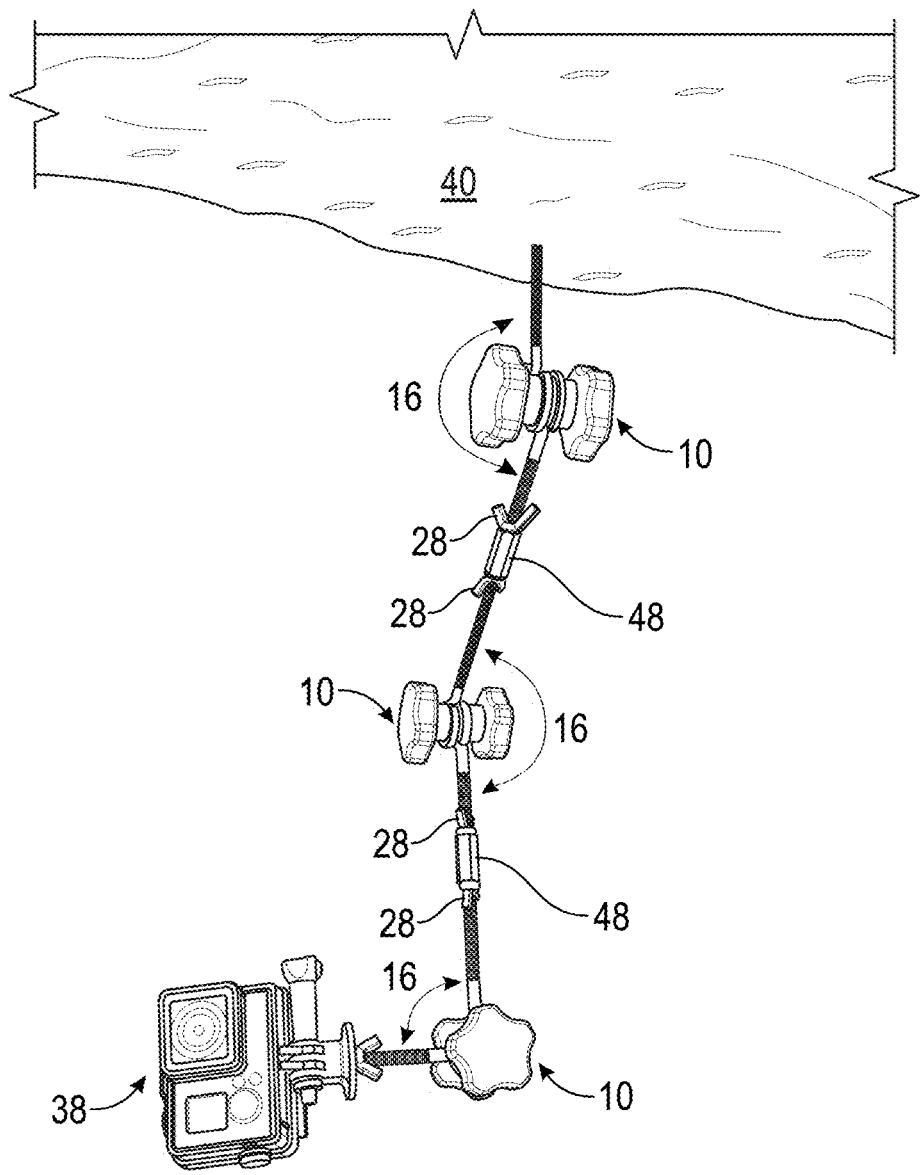
FIG. 7 shows a camera mounted to one of a series of mounting devices of FIG. 1 at a lower location of the camera and a different one of the series of mounting devices of FIG. 1 mounted to a tree, according to some aspects of the present disclosure.

FIG. 7 shows in particular how the mounting device 10 and camera 38 may form part of a self-filming extension unit. The extension unit could for example, and as is shown, comprise three standard mounting devices 10 having eyebolts as the first and second male threaded fasteners 12, 14, two coupling nuts 48, and two wingnuts per coupling nut 48 which serve as the female threaded fastening members 28. The coupling nuts 48 are preferably elongated nuts which have two female threaded ends. The coupling nuts 48 are preferably shaped as cylinders, polygonal prisms (e.g. hexagonal and octagonal prisms), or any known partially hollow shape capable of receiving male threaded members.

The mounting devices 10 within the extension unit are attached mechanically at each end and in series to extend the distance at which the camera 38, tablet 44, or other mountable object can be spaced from the tree 40, post 42, or other fixed object. The ability to adjust the selected angle 16 of each mounting device 10 in accordance with principles described above allows a user to more easily position and orient the mountable object. For example, it may be easiest to secure the mounting device 10 at a particular location of a tree which does not overlook a certain area of land or terrain desired to be monitored. With the extension unit, the user may now mount the mounting device 10 at the most convenient mounting location on the tree and may use several mounting devices 10 to reach the most desirable stationary position and orientation at which the mountable object is then mounted. This stationary position could be behind, under, or above the fixed object, around an obstacle positioned adjacent to the fixed object (such as a branch, another tree, electrical box, outside air conditioning unit, etc.). The mountable object may be oriented as follows: a camera 38 or tablet 44, for example, could face upward, downward, inward, outward, sideways, etc.

It is contemplated that for large or heavy mountable objects, there may be several locations on the large mountable object at which the mounting devices 10 mount to. Thus, the extension unit can include arrangements where the mounting devices are attached in parallel with one another. In such an arrangement, a single mounting device may include more than two male threaded fastening members. One of the male threaded fasteners could attach to the fixed object or another mounting device 10, while the other male threaded fasteners attach to other mounting devices 10 or the large or heavy mountable object. Such arrangements may help increase the stability of the mounted object.

Figure 8:
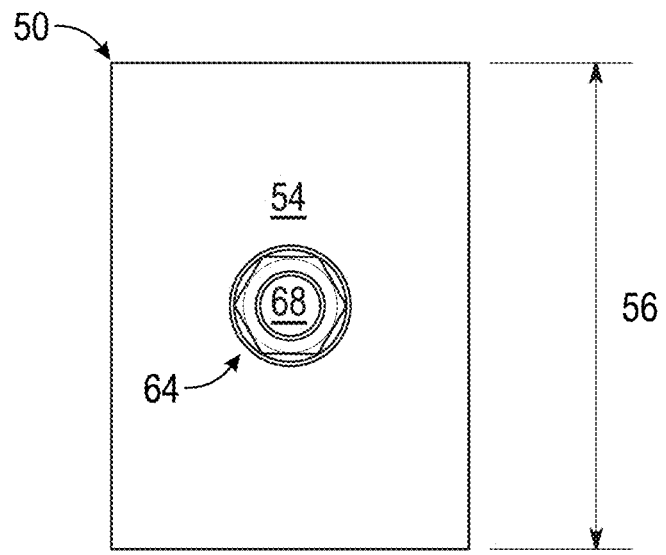
FIG. 8 shows a front elevation view of a T-post adapter, according to some aspects of the present disclosure.
Figure 9:
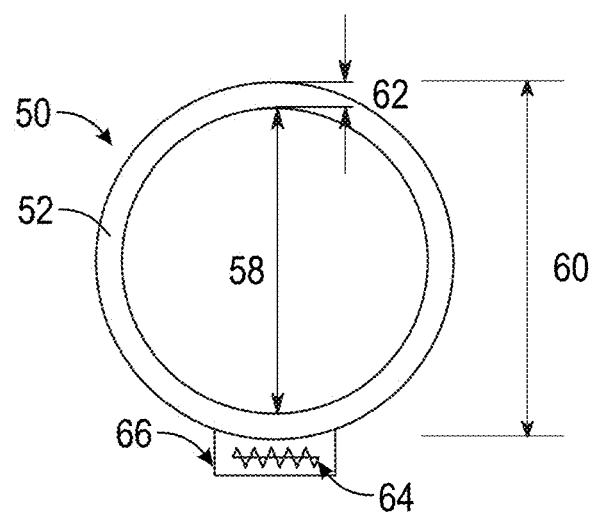
FIG. 9 shows a top elevation view of the T-post adapter of FIG. 8, according to some aspects of the present disclosure.
Figure 10:
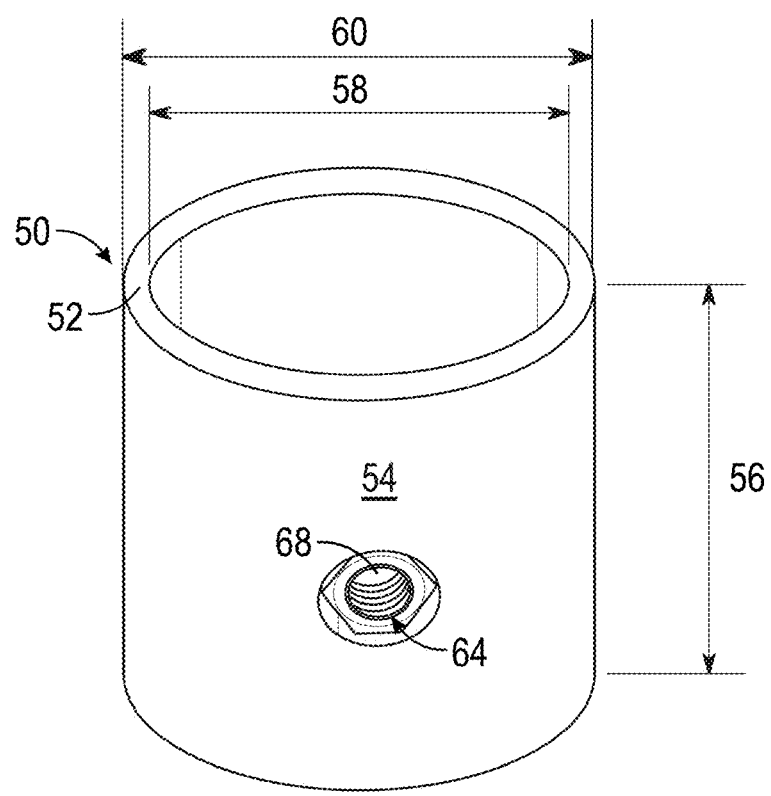
FIG. 10 shows a top and front perspective of the T-post adapter of FIG. 8, according to some aspects of the present disclosure.

Referring now to FIGS. 8-10, an adapter 50 is shown and is configured to secure to the mounting device 10. The adapter 10 typically includes an annular body 52. The annular body 52 may comprise any one or a combination of any known rigid materials, such as metals and metallic alloys, steel, plastics, composites, wood, stone, glass, and synthetic materials imitating the properties of any of the preceding materials. Additionally, while the body of the adapter 50 is described and shown herein as being annular, to reduce the cost and complexity of manufacturing the body, the body may take on any known three-dimensional shape having an aperture therethrough. For example, the body may comprise a partially hollow polyhedron, a surface of revolution (e.g., tori), or any known shape capable of encompassing a portion of a post or other similarly shaped objects.

Figure 11:
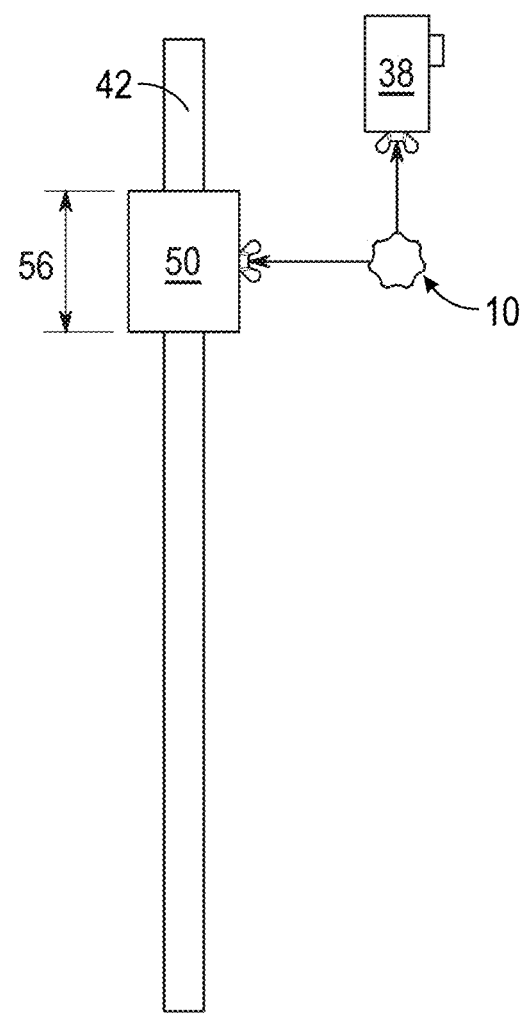
FIG. 11 shows a schematic view of the T-post adapter of FIG. 8 securing a T-post to the mounting device of FIG. 1 and a camera mounted to the mounting device of FIG. 1, according to some aspects of the present disclosure.
Figure 12:
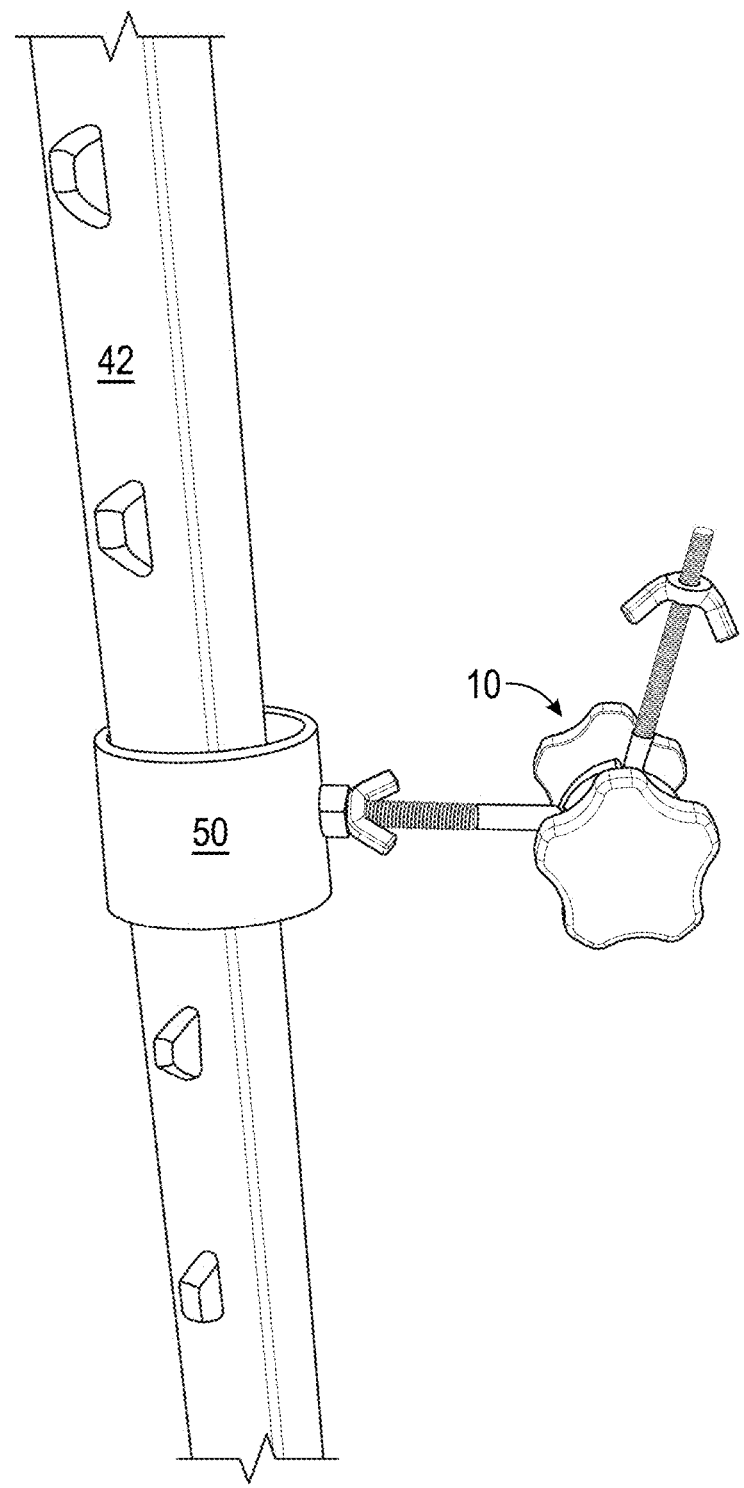
FIG. 12 shows a perspective view of the T-post adapter of FIG. 8 securing a T-post to the mounting device of FIG. 1, according to some aspects of the present disclosure.
Figure 13:
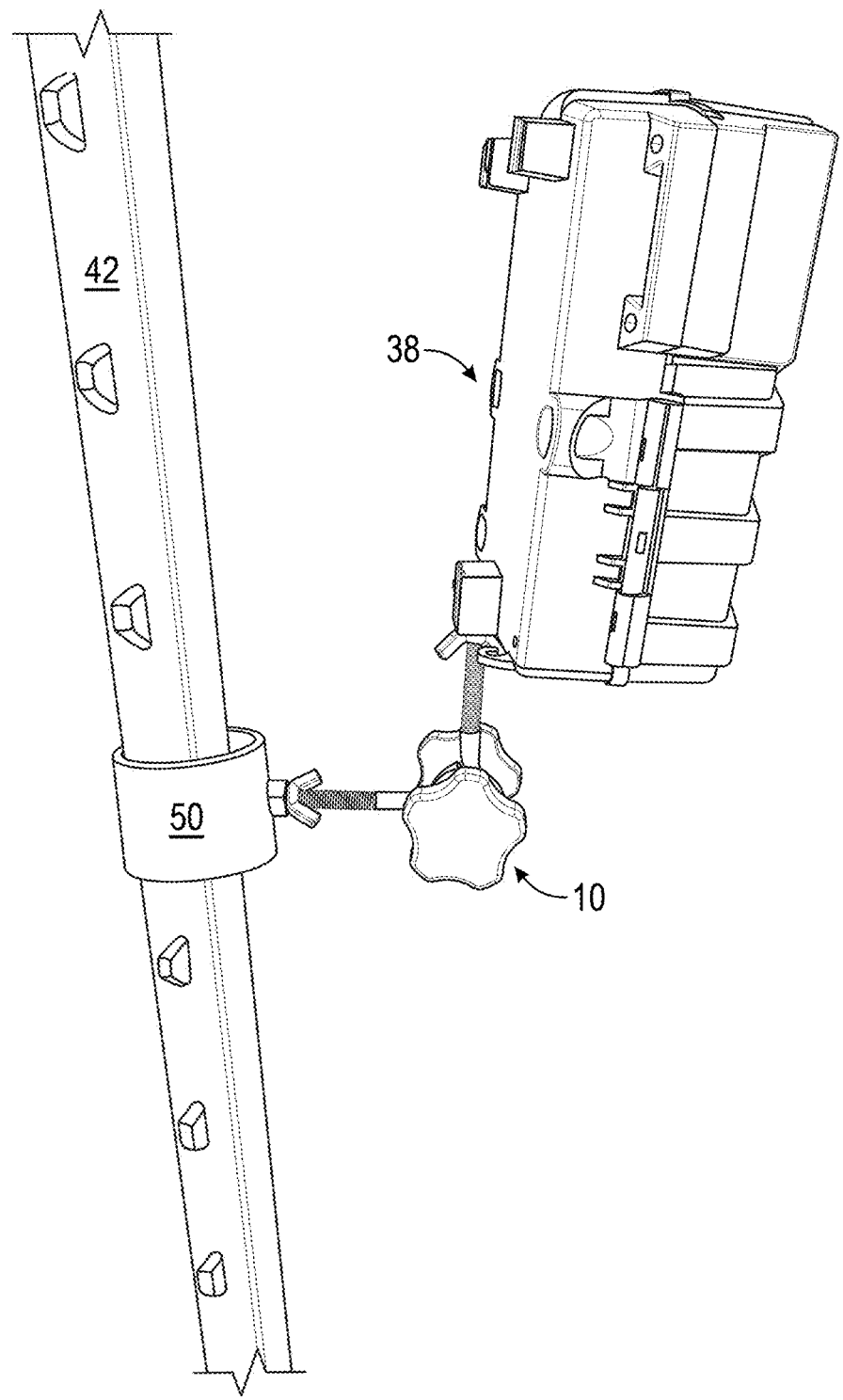
FIG. 13 shows a front perspective view of a camera mounted to the T-post, T-post adapter, and mounting device combination of FIG. 12, according to some aspects of the present disclosure.
Figure 14:
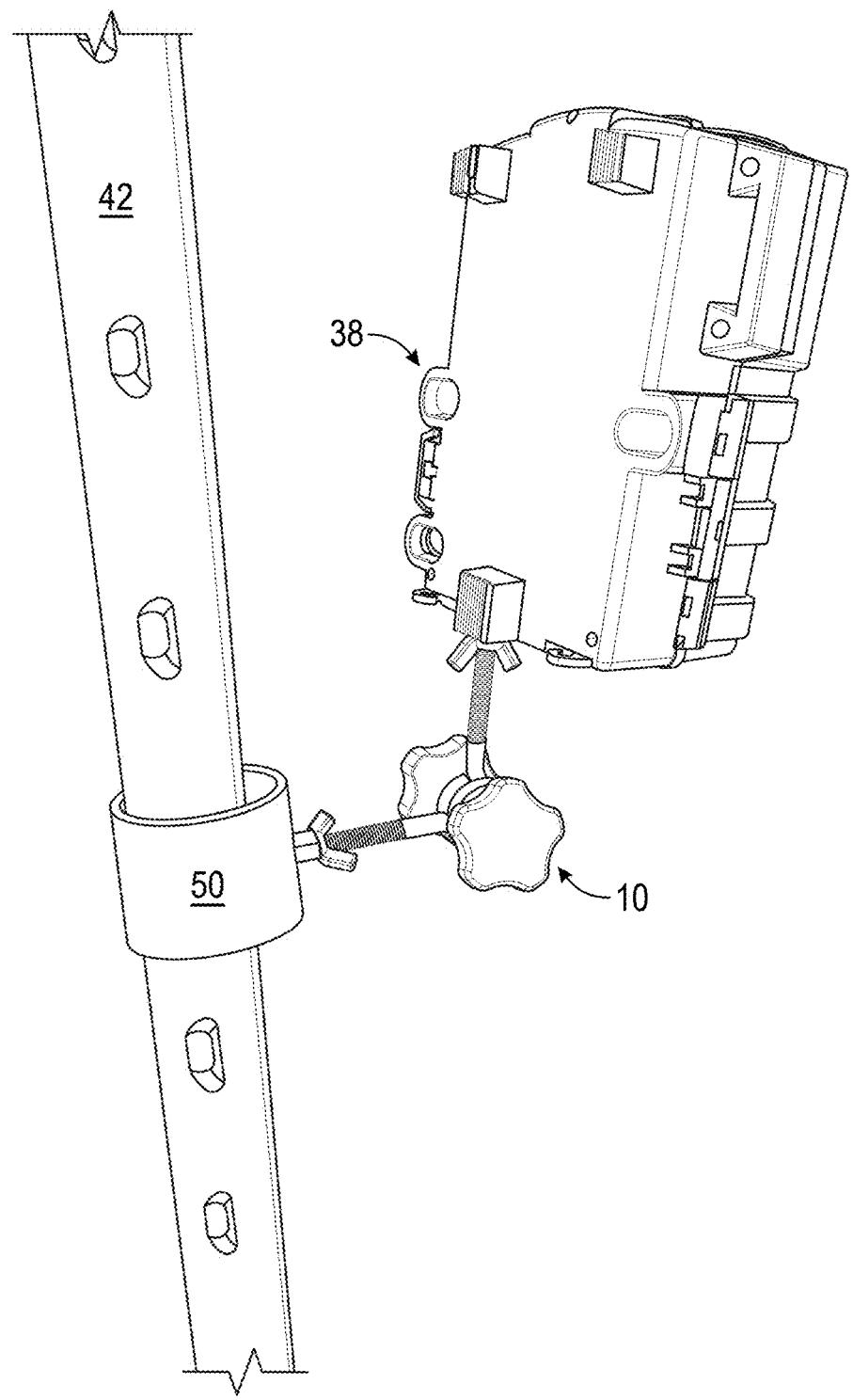
FIG. 14 shows a rear perspective view of a camera mounted to the T-post, T-post adapter, and mounting device combination of FIG. 12, according to some aspects of the present disclosure.
Figures 15, 16:
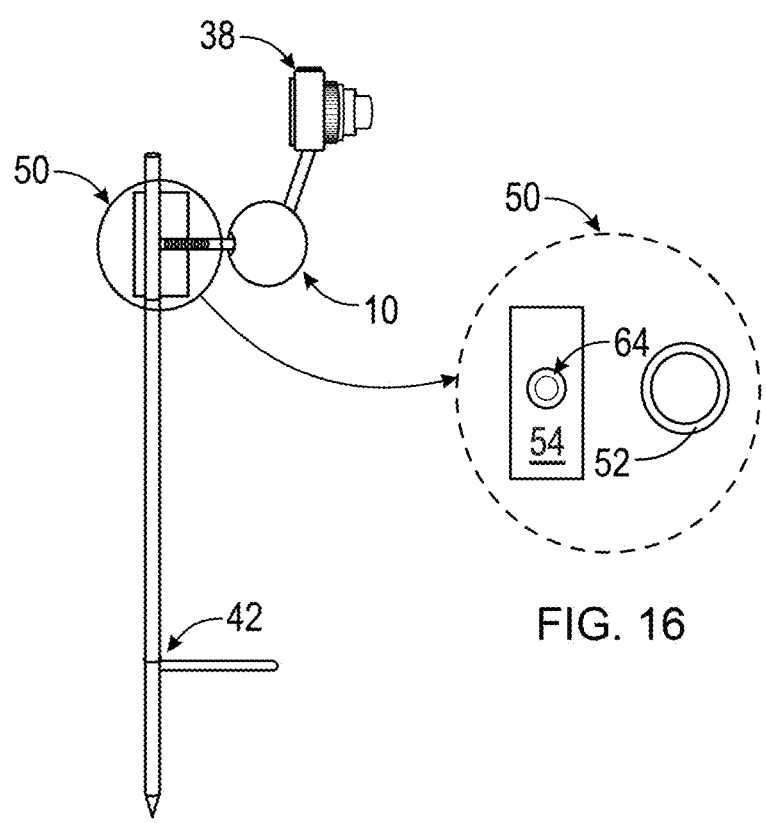
FIG. 15 shows a schematic view of a step-in post adapter securing a step-in post to the mounting device of FIG. 1 and a camera mounted to the mounting device of FIG. 1, according to some aspects of the present disclosure.
FIG. 16 shows detailed elevation views of a step-in post adapter, according to some aspects of the present disclosure.

The annular body 52 includes a circumferential surface 54 defined by a height 56, an inner diameter 58, and an outer diameter 60. To conserve costs on manufacturing and to reduce the complexity of the manufacturing process, the height 56 of the adapter 50 can be equal to or less than twice the inner diameter 58. The outer diameter 60 can be sized to encompass a portion of the post 42, the post typically being a steel fence post such as U-channel post, T-post, or Y-post. For example, FIG. 12 shows a T-post adapter 50 securing a T-post 42 to the mounting device 10. FIGS. 11 and 13-14 show the mounting device 10 further secured to a camera 38. Additionally, as is shown in FIG. 15, step-in posts can be used after being put into the ground by a user where no trees or other posts are readily available. The outer diameter of the annular body 52 would, for example, allowed to be smaller if built to encompass a portion of a step-in post, rather than a T-post, as is shown in FIG. 16.

A thickness 62 of the circumferential surface begins at the outer diameter 60 and terminates at the inner diameter 58. The thickness 62, and thus the outer and inner diameters 60, 58, are not required to be uniform throughout the height 56 of the circumferential surface 54. In fact, varying the thickness 62 throughout the height 56 of the circumferential surface 54 may aid in creating a friction fit with the post 42.

A female threaded receiver 64 is included on or within the annular body 52. As shown in FIG. 9, the female threaded receiver 64 may form a protrusion 66 protruding from the circumferential surface 54. Alternatively, as shown in FIGS. 8 and 10, the female threaded receiver 64 can be located within a cavity 68 of the circumferential surface 54 and can traverse the thickness 62 of the circumferential surface 54. The female threaded receiver 64 is typically centrally located within the circumferential surface 54 with respect to a z-axis of the annular body 52 (i.e., the height 56).

Additional female threaded receivers 64 can be located adjacent the female threaded receiver 64, arrayed about the female threaded receiver 64, positioned on the circumferential surface 54, ninety (90) degrees from the closest adjacent female threaded receiver 64, one-hundred eighty (180) degrees from the closest female threaded receiver 54, positioned above or below the closest female threaded receiver 64, or the like. Additional female threaded receivers 64 allow for several mounting devices 10 to secure to a single post 42 through the use of a single adapter 50. These several mounting devices 10 can then secure to a single (potentially large or heavy) object, such as a camera 38 or a tablet 44.

From the foregoing, it can be seen that the present invention accomplishes at least all of the stated objectives.

LIST OF REFERENCE CHARACTERS

The following reference characters and descriptors are not exhaustive, nor limiting, and include reasonable equivalents. If possible, elements identified by a reference character may replace or supplement any element identified by another reference character.

10 mounting device
12 first male threaded fastening member (e.g., a lag screw)
14 second male threaded fastening member (e.g., a first bolt)
16 selected angle
18 hook
20 spacing device (e.g., a nylon or rubber spacer or a washer)
22 first diameter
24 second diameter
26 flange
28 female threaded fastening member (e.g., a wingnut)
30 wing
32 base plate
34 joining member (e.g., a second bolt)
36 female threaded fastening member (e.g., a star knob)
38 camera
40 tree
42 post (e.g., U-channel, T-post, Y-post, step-in post)
44 tablet
48 coupling nut
50 adapter
52 annular body
54 circumferential surface
56 height
58 inner diameter
60 outer diameter
62 thickness
64 threaded receiver
66 protrusion
68 cavity The present disclosure is not to be limited to the particular embodiments described herein. The following claims set forth a number of the embodiments of the present disclosure with greater particularity.

What is claimed is:

1. A mounting device comprising:
a first male threaded fastening member;
a second male threaded fastening member secured to the first male threaded fastening member with a male threaded joining member and a female threaded fastening member;
a first hook surrounding a threaded portion of the male threaded joining member;
a second hook surrounding the threaded portion of the male threaded joining member; and
a nylon or rubber spacer:
(i) including a flange preventing the first hook from contacting the second hook;
(ii) being at least partially surrounded by the first hook and the second hook,
(iii) encompassing the threaded portion of the male threaded joining member, and
(iv) being located at least partially between the first male threaded fastening member and the second male threaded fastening member;
wherein the first male threaded fastening member is adapted to mount to an outdoor structure and the second male threaded fastening member is adapted to secure an object thereto; and
wherein tightening the female threaded fastening member is possible without the use of tools and tightening the female threaded fastening member fixes an angle between the first male threaded fastening member and the second male threaded fastening member.

2. The mounting device of claim 1 wherein either the first male threaded fastening member or the second male threaded fastening member is a bolt or a lag screw.

3. The mounting device of claim 1 wherein the male threaded joining member is a bolt.

4. The mounting device of claim 1 wherein the female threaded fastening member is a wingnut or a star knob.

5. A system comprising:
the mounting device of claim 1;
an object mounted to the second male threaded fastening member of the mounting device; and
an outdoor structure in which the first male threaded fastening member of the mounting device is mounted to.

6. The system of claim 5 wherein the outdoor structure is a U-channel post, a tree, or the ground.

7. The system of claim 5 wherein the outdoor structure is a step-in post inserted into the ground and the system further comprises a step-in post adapter encompassing a portion of the step-in post to facilitate securement between the step-in post and the mounting device.

8. The system of claim 5 wherein the outdoor structure is a T-post or Y-post and the system further comprises a T-post adapter or a Y-post adapter encompassing a portion of the T-post or the Y-post to facilitate securement between the step-in post and the mounting device.

9. The system of claim 5 wherein the object is a camera or a tablet.

10. A method of mounting the mounting device according to claim 1 comprising:
securing the first male threaded fastening member to an outdoor structure;
securing the second male threaded fastening member to an object; and
preventing movement of the object after securing the second male threaded fastening member.

11. The method of claim 10 further comprising tightening the female threaded fastening member.

12. A mounting device comprising:
a first male threaded fastening member;
a second male threaded fastening member secured to the first male threaded fastening member with a male threaded joining member and a female threaded fastening member;
a first hook surrounding a threaded portion of the male threaded joining member;
a second hook surrounding the threaded portion of the male threaded joining member; and a nylon or rubber spacer:

(i) being at least partially surrounded by the first hook and the second hook,
(ii) encompassing the threaded portion of the male threaded joining member, and
(iii) being located at least partially between the first male threaded fastening member and the second male threaded fastening member;

wherein the first male threaded fastening member is adapted to mount to an outdoor structure and the second male threaded fastening member is adapted to secure an object thereto; and wherein tightening the female threaded fastening member is possible without the use of tools and tightening the female threaded fastening member fixes an angle between the first male threaded fastening member and the second male threaded fastening member.

13. A mounting device comprising:
a first male threaded fastening member;
a second male threaded fastening member secured to the first male threaded fastening member with a male threaded joining member and a female threaded fastening member;
a first hook surrounding a threaded portion of the male threaded joining member;
a second hook surrounding the threaded portion of the male threaded joining member; and
a nylon or rubber spacer:
(i) including a flange preventing the first hook from contacting the second hook;
(ii) being at least partially surrounded by the first hook and the second hook,
(iii) encompassing the threaded portion of the male threaded joining member, and
(iv) being located at least partially between the first male threaded fastening member and the second male threaded fastening member;

wherein the first male threaded fastening member is adapted to mount to an outdoor structure and the second male threaded fastening member is adapted to secure an object thereto; and wherein tightening the female threaded fastening member is possible without the use of tools and tightening the female threaded fastening member fixes an angle between the first male threaded fastening member and the second male threaded fastening member;

wherein the male threaded joining member includes a wingnut or a star knob at an end opposite where the male threaded joining member attaches to the female threaded fastening member.

* * * * *